United States Patent Office.

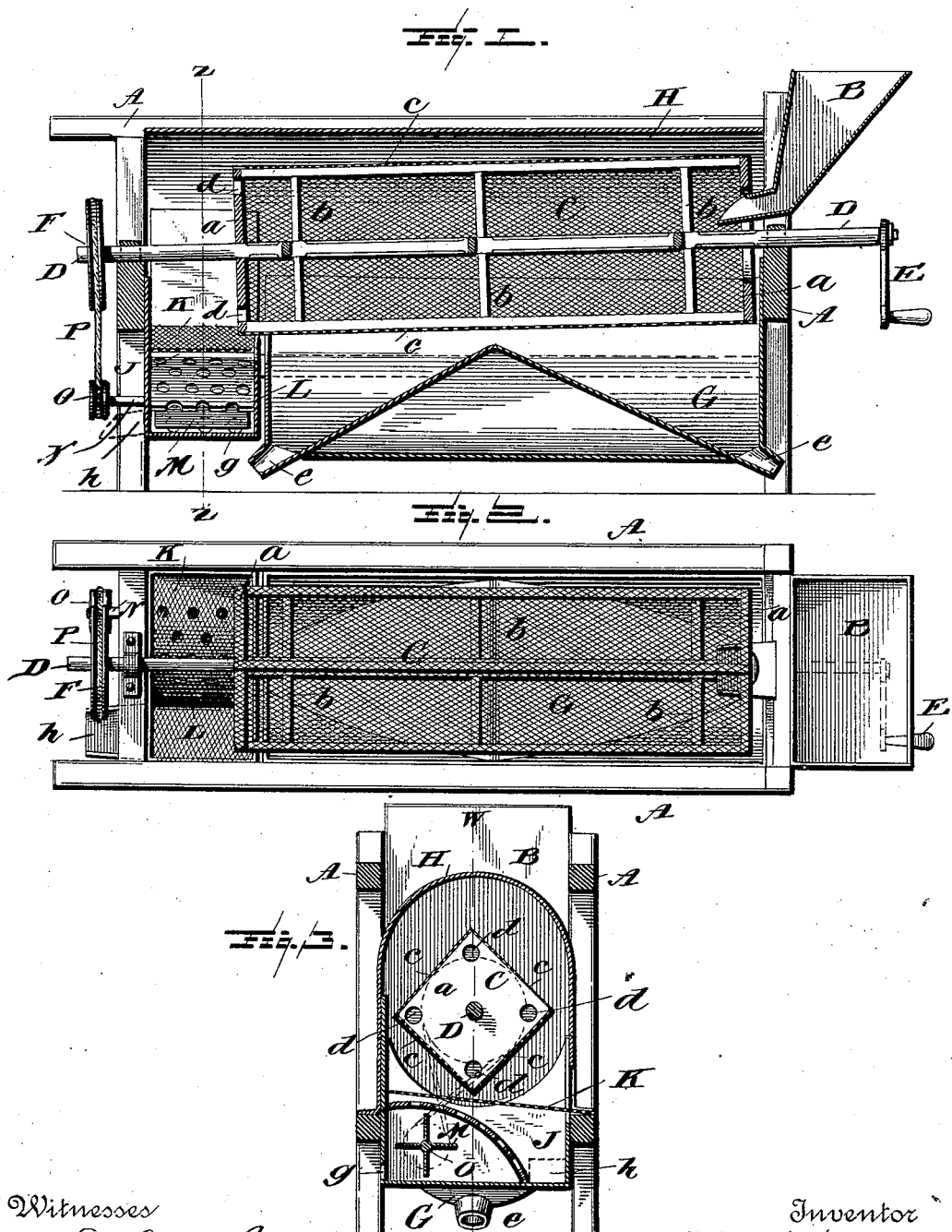

LARKIN G. CALDWELL, OF SHELBINA, MISSOURI.

GRAIN-SEPARATOR.

SPECIFICATION forming part of Letters Patent No. 453,232, dated June 2, 1891.

Application filed February 3, 1891. Serial No. 380,014. (No model.)

*To all whom it may concern:*

Be it known that I, LARKIN G. CALDWELL, a citizen of the United States, residing at Shelbina, in the county of Shelby and State of Missouri, have invented certain new and useful Improvements in Grain-Separators; and I do hereby declare that the following is a full, clear, and exact description of the same, reference being had to the annexed drawings, making a part of this specification, and to the letters of reference marked thereon.

This invention relates to certain new and useful improvements in wheat-cleaners; and it has for its objects, among others, to provide an improved machine of this class designed, primarily, for hand-power, but capable of being operated otherwise, if desired, wherein the wheat is graded, the pure wheat being cleaned of all impurities by a fan or blower at the discharge end of the machine. The fan or blower is arranged within a chamber having a perforated wall through which the wind is forced and acts upon the wheat in the adjacent compartment. The device is simple, cheap of manufacture, durable and efficient, and not liable to get out of order.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a central vertical longitudinal section through my improved device, the section being taken on the line *w w* of Fig. 3. Fig. 2 is a top plan with the cover removed. Fig. 3 is a vertical cross-section on the line *z z* of Fig. 1.

Like letters of reference indicate like parts throughout the several views.

Referring now to the details of the drawings by letter, A designates the supporting-frame, at one end of which is arranged the hopper or feed-spout B, which may be of any known or preferred construction, and which has its discharge-mouth entering and extended into the receiving end of the rotary screen C, as clearly shown in Fig. 1.

The screen C is carried by the shaft D, which is journaled in suitable boxes or bearings in the frame and is slightly inclined from its receiving to its delivery or discharge end, as seen in Fig. 1, to aid in the passage of the material to be cleaned. It consists of the heads *a*, the spiders *b*, and the covering *c*, which may be of any desired mesh and secured to the longitudinal bars which connect the heads and spiders. The head at the receiving end is open at the center, as seen in Fig. 1, to receive the discharge end of the hopper or spout. The screen is substantially square in cross-section, as seen in Fig. 3, in order to better agitate the material and more thoroughly screen the same in its passage therethrough. The head at the delivery end is provided with a plurality of holes *d*, one near each corner, as seen in Figs. 1 and 3, to provide better circulation therethrough.

The shaft D is provided at one end with suitable means for revolving it. When designed to be operated by hand, it has a crank-handle E; but it will of course be understood that for steam or other power a corresponding change in this respect will be necessary. The other end of this shaft projects beyond the frame and is provided with a grooved pulley F, for a purpose which will soon be made apparent. Beneath the screen is a suitable box or receptacle G, which is formed, as seen best in Fig. 1, with oppositely-slanting or inclined walls with the apex at the center of the screen, and thus forming two receptacles or compartments, each of which is provided with a suitable outlet *e*, as seen in said Fig. 1.

A cover H is provided over the whole device, and this may be curved, as shown, or of other form. It is secured in position in any convenient manner.

The screen does not extend entirely to the discharge end of the frame, but terminates at a distance therefrom, as seen in Figs. 1 and 2, and in the space thus provided is arranged the pure-wheat receptacle J, the upper surface of which is formed by the screen K, of fine mesh, as seen in Figs. 1 and 3, the discharge end of the rotary screen terminating just over this fine screen, as seen in Fig. 1. Beneath this fine screen is a curved partition L, of perforated material, extending about two thirds of the way across the pure-wheat compartment, as seen in Fig. 3, and within the compartment thus provided, beneath the partition, is located a rotary fan or fans M, of any known construction, carried by a shaft N, suitably journaled and extended at one end beyond the end of the frame, as seen in Figs. 1 and 2, and carrying a grooved pulley O, around which and the grooved pulley on the shaft D passes an endless belt P, by which the fan is driven from the screen-shaft, in a manner which will be readily understood. The fan-chamber is provided with a suitable air-inlet $g$ and the pure-wheat receptacle with a suitable outlet $h$.

The operation will be readily understood. The material is fed to the machine through the hopper and the rotary screen and fans set in motion. As the material advances toward the discharge end of the screen, it is divested of its refuse, the finer of which is discharged into the compartment nearest the receiving end, the smaller wheat and fine stuff into the next compartment, and the pure wheat into the pure-wheat receptacle through the openings in the head at the discharge end of the screen, and here it is cleaned of all refuse and light particles that may have followed it in its course to this point. The perforated partition prevents clogging of the fans, and yet permits the outlet of the air into the wheat.

What I claim as new is—

1. In a grain-separator, the combination, with the rotary screen, of the double-inclined floored receptacle beneath the same and the pure-wheat receptacle beyond the same and independent thereof, substantially as described.

2. In a grain-separator, the combination, with the rotary screen, the double receptacle beneath the same, and the pure-wheat receptacle beyond the same and having the discharge end of the screen thereabove, of the curved perforated partition in the pure-wheat receptacle, and the rotary fans beneath said partition, substantially as specified.

3. In a grain-separator, the combination, with the rotary screen and the pure-wheat receptacle arranged beneath the discharge end thereof and having perforated top, of the curved perforated partition beneath the said top, and the rotary fans beneath the said partition and operated from connections with the screen-shaft, substantially as specified.

4. The grain-separator described, consisting of the frame, the inclined shaft supported therein, the square screen carried by the said shaft, the hopper, the double compartment beneath the screen, the independent pure-wheat receptacle beyond the discharge end of the screen, the perforated top thereto, the curved perforated partition, the fans located beneath the same, the cover to the whole, the pulleys on the shafts of the screen and fan, and the endless belts connecting said pulleys, all arranged and operating substantially as shown and described.

In testimony that I claim the above I have hereunto subscribed my name in the presence of two witnesses.

LARKIN G. CALDWELL.

Witnesses:
A. W. COMBS,
I. M. WHITE.